US006953518B2

(12) United States Patent
Nobukawa

(10) Patent No.: US 6,953,518 B2
(45) Date of Patent: Oct. 11, 2005

(54) APPARATUS FOR CONCENTRATING A SPECIFIC INGREDIENT-DISSOLVED LIQUID

(75) Inventor: Hisashi Nobukawa, Higashihiroshima (JP)

(73) Assignee: Hiroshima University, Higashihiroshima (JP)

( * ) Notice: Subject to any disclaimer, the term of this patent is extended or adjusted under 35 U.S.C. 154(b) by 728 days.

(21) Appl. No.: 09/874,315

(22) Filed: Jun. 6, 2001

(65) Prior Publication Data

US 2002/0023867 A1 Feb. 28, 2002

(30) Foreign Application Priority Data

Jun. 7, 2000 (JP) ....................................... 2000-170459

(51) Int. Cl.[7] .................................................. B01D 3/00
(52) U.S. Cl. ......................... 202/234; 202/182; 203/10; 159/1
(58) Field of Search .............................. 159/1; 202/182, 202/234; 203/10

(56) References Cited

U.S. PATENT DOCUMENTS

| | | | | |
|---|---|---|---|---|
| 1,932,405 A | * | 10/1933 | Harris | 203/12 |
| 3,779,029 A | * | 12/1973 | Larriva | 62/138 |
| 4,172,767 A | * | 10/1979 | Sear | 202/182 |
| 5,960,859 A | * | 10/1999 | Sakurai | 165/43 |
| 6,447,685 B1 | * | 9/2002 | Saal et al. | 210/662 |

* cited by examiner

*Primary Examiner*—N. Bhat
(74) *Attorney, Agent, or Firm*—Buchanan Ingersoll PC

(57) ABSTRACT

A specific ingredient-dissolved liquid condensing apparatus, comprising an upper tank, a lower tank provided under the upper tank, the upper tank being provided with a liquid-falling opening and a valve for falling a specific ingredient-dissolved liquid in the upper tank to the lower tank, a circulator for circulating the specific ingredient-dissolved liquid in the upper tank, and a transfer means for transferring the specific ingredient-dissolved liquid in the lower tank into the upper tank.

10 Claims, 2 Drawing Sheets

APPARATUS FOR CONCENTRATING A SPECIFIC INGREDIENT-DISSOLVED LIQUID

BACKGROUND OF THE INVENTION (1) Field of the Invention

The present invention relates to an apparatus for concentrating a specific ingredient-dissolved liquid. The invention relates particularly to an apparatus for concentrating a specific ingredient-dissolved liquid containing a specific ingredient recovered in sea water.

(2) Related Art Statement

There are various ingredients dissolved in sea water. Recovery and effective utilization of such ingredients are effective particularly in case that land resources are poor. In the prior art, it has been difficult to take up sufficient ingredients from sea water because of low performance of adsorbents. However, recently, researches and development of adsorbents have been proceeded, resulting in development of excellent adsorbents capable of recovering ingredients in sea water.

As such adsorbents, adsorbents for adsorbing lithium or uranium are known, for example. Lithium and uranium are almost uniformly dissolved in sea water, but their concentrations are extremely low. Therefore, an adsorbed specific ingredient, for example, adsorbed lithium, desorbed with a desorbing liquid to obtain a specific ingredient-dissolved liquid in which the specific ingredient is dissolved, the concentration is still low. Thus, the specific ingredient-dissolved liquid needs to be concentrated. Formerly, the specific ingredient-dissolved liquid has been directly concentrated with a heating boiler.

However, when the specific ingredient-dissolved liquid is directly concentrated with the heating boiler as in the prior art, it is advantageous in effecting the concentrating treatment in a short time period, which however requires a large amount of energy. Use of a large amount of energy affords adverse effect upon the concentrating cost. Therefore, an apparatus which enables concentration while energy is reduced as much as possible has been demanded. However, such an energy-saving apparatus for concentrating specific ingredient-dissolved liquid has not been known yet.

SUMMARY OF THE INVENTION

Therefore, it is an object of the present invention to provide an energy-saving type apparatus for concentrating a specific ingredient-dissolved liquid.

In order to accomplish the above object, the present inventors discovered an apparatus which concentrates the specific ingredient-dissolved liquid, while circulating the liquid in a tank.

A specific ingredient-dissolved liquid condensing apparatus according to the present invention comprises an upper tank, a lower tank provided under the upper tank, the upper tank being provided with a liquid-falling opening and a valve for falling a specific ingredient-dissolved liquid in the upper tank to the lower tank, a circulator for circulating the specific ingredient-dissolved liquid in the upper tank, and a transfer means for transferring the specific ingredient-dissolved liquid in the lower tank into the upper tank.

The circulator functions to circulate the specific ingredient-dissolved liquid in the upper tank and condensing the liquid. Thereby, the liquid can be condensed.

The transfer means such as a pump or the like functions to transfer the specific ingredient-dissolved liquid in the lower tank into the upper tank. When an electromagnetic valve is used as the value, the opening/closing operation of the liquid-falling opening at the bottom of the upper tank can be rapidly effected.

A preferred embodiment of the specific ingredient-dissolved liquid condensing apparatus according to the present invention further comprises a controller for controlling the valve and circulator such that when the weather is not rainy, the valve is closed and the circulator circulate the specific ingredient-dissolved liquid in the upper tank, whereas when it is rainy or rains, the circulation of the specific ingredient-dissolved liquid is stopped, the valve is opened to fall the specific ingredient-dissolved liquid in the upper tank into the lower tank through the liquid-falling opening, and then the valve is closed.

According to this embodiment, when the weather is not rainy, the specific ingredient-dissolved liquid can be effectively condensed in the upper tank through the circulator, whereas when it is rainy or rains, the specific ingredient-dissolved liquid can be speedily transferred to the lower tank to avoid the dilution of the specific ingredient-dissolved liquid with rain water. After the specific ingredient-dissolved liquid is transferred in the lower tank, the valve is closed to collect rain water in the upper tank.

The rain water collected in the upper tank can be transferred to another tank (fresh water tank) through the liquid-falling opening provided in the upper opening. The rain water stored in the fresh water can be used as fresh water to produce the specific ingredient-dissolved liquid.

The circulator and/or the transfer means comprises a fountain for ejecting the specific ingredient-dissolved liquid above the liquid in the upper tank.

The fountain functions to spray the specific ingredient-dissolved liquid in the form of easily evaporable fine water drops. For example, when a spray nozzle is provided as the fountain, the specific ingredient-dissolved liquid can be sprayed above the liquid in the upper tank. As a result, the specific ingredient-dissolved liquid can be condensed, while the liquid is being sprayed by the fountain. The provision of plural fountains enhances the efficiency for condensing the specific ingredient-dissolved liquid.

A further preferred embodiment of the specific ingredient-dissolved liquid condensing apparatus according to the present invention further comprises a fresh water tank for storing rain water collected in the upper tank.

The fresh water tank functions to store rain water temporarily collected in the upper tank. The fresh water stored in the fresh water tank can be used as clean water to produce the specific ingredient-dissolved liquid.

A further preferred embodiment of the specific ingredient-dissolved liquid condensing apparatus according to the present invention further comprises a condensing tank for storing the specific ingredient-dissolved liquid condensed in the upper tank.

The condensing tank is a tank for storing the condensed specific ingredient-dissolved liquid. The specific ingredient-dissolved liquid condensed to some extent by the circulator or the fountain is further condensed by evaporating the liquid under heating. The specific ingredient-dissolved liquid may be evaporated under heating inside or outside the concentrated liquid-storing tank.

Further, a further preferred embodiment of the specific ingredient-dissolved liquid condensing apparatus according to the present invention further comprises a boiler for further condensing the condensed specific ingredient-dissolved liquid. This boiler is used for further condensing the condensed specific ingredient-dissolved liquid under heating.

A still further preferred embodiment of the specific ingredient-dissolved liquid condensing apparatus according to the present invention further comprises a treating tank for treating the concentrated specific ingredient-dissolved liquid.

The treating tank functions to separate and purify the specific ingredient present in the condensed liquid. For example, alkaline treatment or the like is necessary for lithium. This treating tank is a tank for effecting such separation and purification through the alkaline treatment.

A still further preferred embodiment of the specific ingredient-dissolved liquid condensing apparatus according to the present invention further comprises a buoyancy frame for floating the apparatus in water and a mooring unit for fixing the apparatus at a given location of said water. The buoyancy frame and the mooring unit enables the condensing apparatus to operate at a desired location of water (sea water).

A still further preferred embodiment of the specific ingredient-dissolved liquid condensing apparatus according to the present invention further comprises a crane movably arranged above the upper tank. This crane functions to carry necessary materials such as sodium carbonate for the alkaline treatment.

These and other objects, features and advantages of the invention will be explained in more detail with reference to the attached drawings, wherein.

BRIEF DESCRIPTION OF THE INVENTION

Embodiments of the concentrating apparatus according to the present invention will be explained with reference to the drawings.

Figures 1A, 1B, 1C:
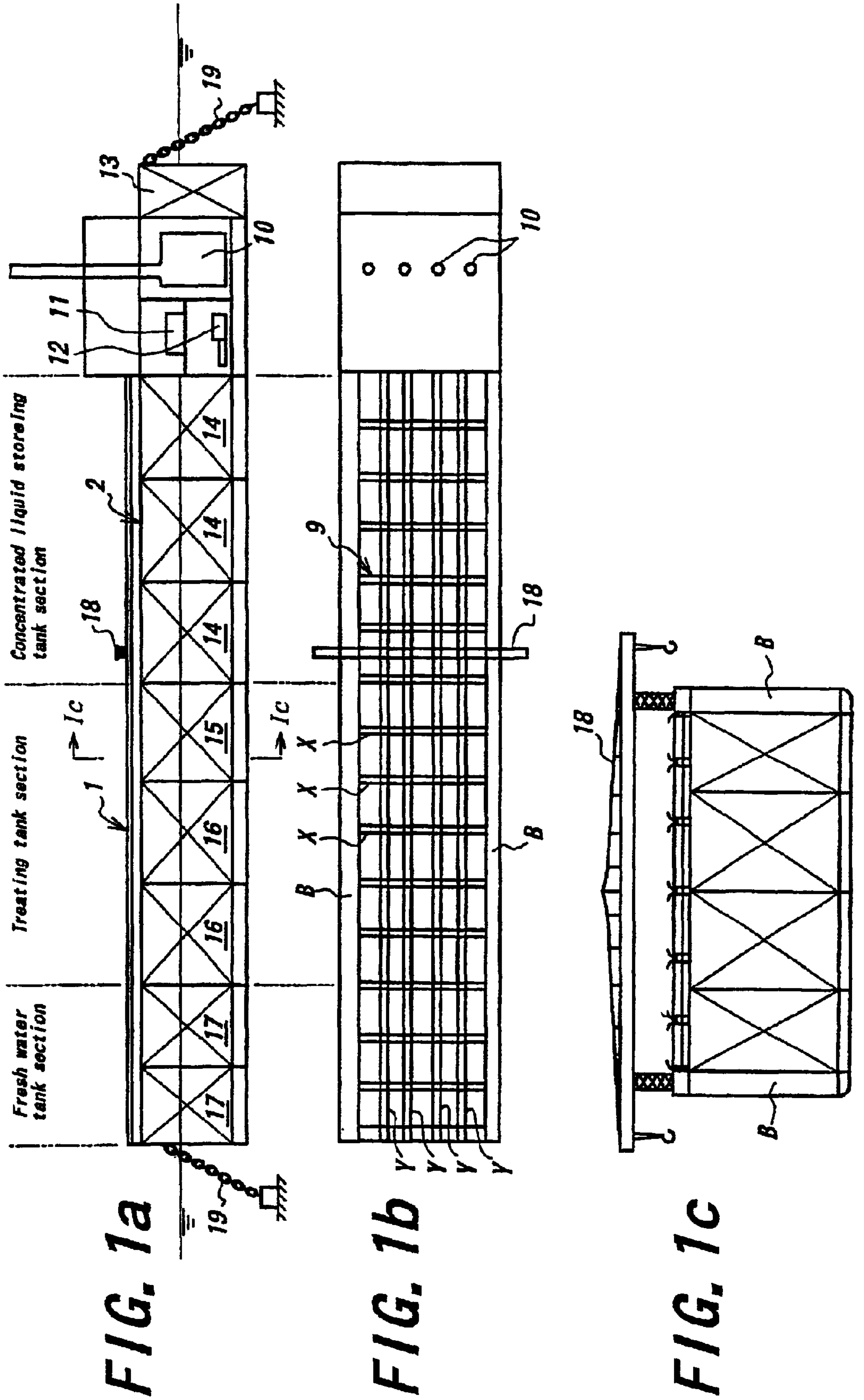
FIG. 1(*a*) is a front view of the specific ingredient-condensing apparatus according to one embodiment of the present invention, FIG. 1(*b*) and FIG. 1(*c*) being a plane view and a sectional view along with a line Ic—Ic of the apparatus in FIG. 1(*a*), respectively.

FIG. 1(*a*) to 1(*c*) are a front view, a plane view and a sectional view taken along a line Ic—Ic of one embodiment of the concentrating apparatus according to the present invention, respectively.

Figure 2A:
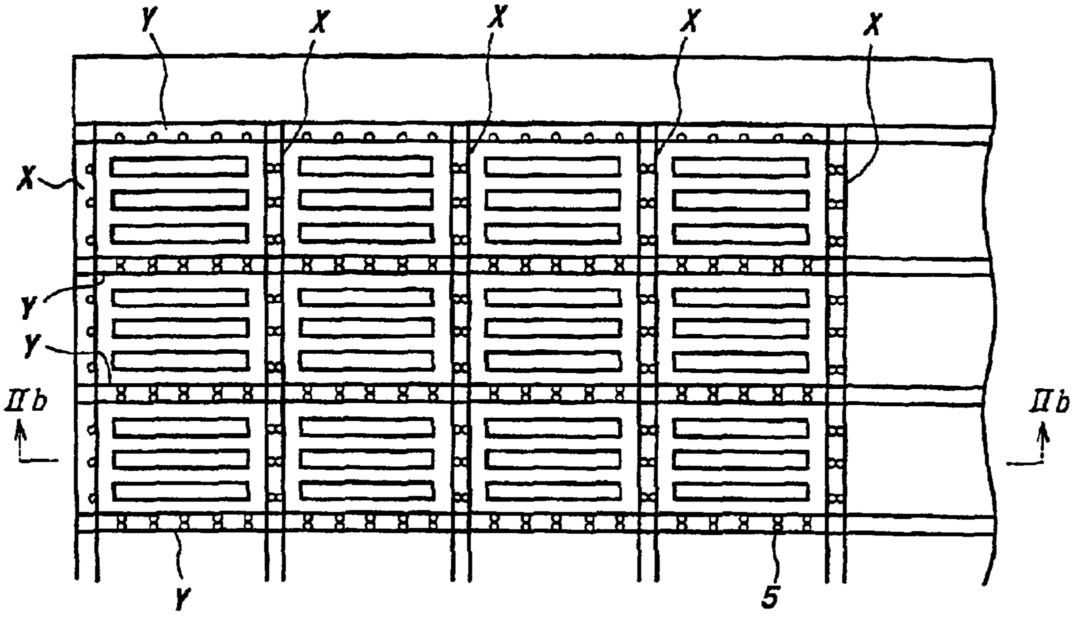
FIG. 2(*a*) is a plane view of a part of the condensing apparatus in FIGS. 1(*a*) to 1(*c*), FIGS. 2(*b*) and 2(*c*) being a sectional view of FIG. 2(*a*) along a line IIb—IIb and FIG. 2(*c*) being an enlarged sectional view of FIG. 2(*b*), respectively.
Figure 2B:
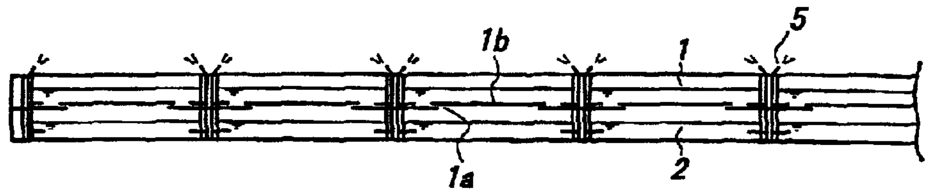
Figure 2C:
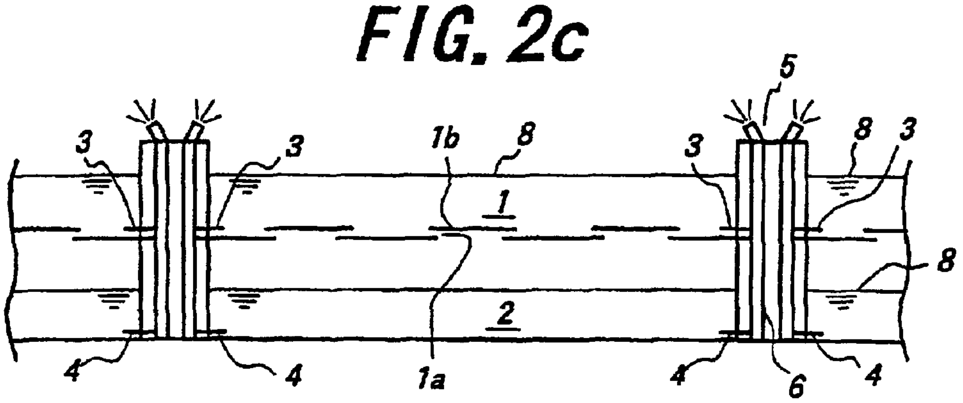

In FIGS. 1(*a*) to 1(*c*) and FIGS. 2(*a*) to 2(*c*), a concentrating apparatus is arranged in a buoyancy frame B. An upper tank 1 has liquid-falling openings 1*a* which are provided with valves 1*b*, and a lower tank 2 is arranged under the upper tank 1. In this embodiment, a condensed liquid-storing tank section 14, 14, 14, a treating tank section 15–16, and a fresh tank section 17, 17 are provided as shown in FIGS. 1(*a*) and (*b*) besides the upper and lower tanks 1, 2. As shown in FIGS. 1(*a*), 1(*b*) and 1(*c*), each tank section is divided laterally and longitudinally divided into plural tank portions (14, 14, 14; 16, 15; 17, 17), although the plural tank portions of each tank section may be continuous or partitioned. As clearly shown in FIG. 1(*b*) and FIG. 2(*a*), beams X and Y are provided laterally and longitudinally in the form of a matrix-like partitioning lattice 9 above the upper tank 1. The lattice 9 downwardly extend to prevent movement of the fresh water between the adjacent tank portions of each tank section, the specific ingredient-dissolved liquid or the condensed liquid due to swinging of the buoyancy frame.

Rain water is collected in the upper tank 1 as mentioned later, and is stored in the fresh water tank section 17. The specific ingredient-dissolved liquid is fed into the treating tank section 15–16 where the specific ingredient-dissolved liquid is poured and condensed through evaporation under sun. The concentrated liquid storing tank section 14 stores the condensed specific ingredient-dissolved liquid which is transferred from the treating tank section 15–16 by pumps or the like (not shown).

The concentrated liquid is transferred to a boiler 10 where it is further condensed through evaporation under heating. An electric motor 11 is adapted to open or close electromagnetic valves (mentioned later), and feed necessary electric power to the entire system. A pump 12 is adapted to transfer the concentrated liquid in the concentrated liquid tank section 4 to the boiler. A fuel tank 13 is for operating the boiler 10. A deck-running crane unit 18 is longitudinally movably provided above the buoyancy side frames B. A mooring unit 19 is provided to moor the concentrating apparatus at a fixed location.

FIGS. 2(*a*), 2(*b*) and 2(*c*) are an enlarged plane view showing a part of the concentrating apparatus in FIG. 1, a sectional view of FIG. 2(*a*) and an enlarged sectional view of FIG. 2(*c*), respectively.

The lower tank 2 is provided under the upper tank 1, and is divided into a condensed liquid-storing tank section, a treating tank section, and a fresh tank section corresponding to those of the upper tank as show in FIGS. 1(*a*) and (*b*). The upper treating tank section has liquid-falling openings 1*a*, and valves 1*b* such as electromagnetic valves are provided for these liquid-falling openings l*a*. The opening/closing operation of the valves 1*b* is controlled manually or by a control unit (not shown).

In the treating tank section 15–16 are provided circulators 6 extending from the bottom portion of the lower tank 2 to above the liquid surface in the upper tank 1 both for circulating the specific ingredient-dissolved liquid in the upper tank 1 and for transferring the specific ingredient-dissolved liquid from the lower tank to the upper.

In this embodiment, a fountain 5 is provided at an upper end portion of the circulator 6 for spraying the specific ingredient-dissolved liquid from the upper and/or lower tank to above the liquid surface of the upper tank 1. As seen in FIGS. 2(*a*) and 2(*b*), the fountains 5 and the circulators 6 are provided through the lateral and longitudinal beams X and Y. Pipe openings 3 and 4 are provided at the circulator 6 near the bottom portions of the upper and lower treating sections for introducing the specific ingredient-dissolved liquid into the circulator by means of pump (not shown). A reference numeral 8 denotes the surface of the specific ingredient-dissolved liquid.

First, concentrating of the specific ingredient-dissolved liquid when the weather is fine will be explained. The specific ingredient-dissolved liquid, which is carried by a tanker, is transferred into the treating section in the upper tank 1 of the concentrating apparatus set in the buoyancy frame in the ocean (See FIG. 1(*a*)). At that time, the liquid-falling openings 1*a* of the treating section 15, 16 in the upper tank 1 are kept closed, and the lower treating tank section is vacant. The specific ingredient-dissolved solution, which is transferred to the treating section, is raised via the pipe openings 3 through the circulating pipe 6. In this embodiment, the specific ingredient-dissolved liquid is sprayed above the treating tank section through the fountains 5 such as spray nozzles at the upper end portions of the circulating pipes 6. While the specific ingredient-dissolved liquid is being circulated in the treating tank section, the liquid is evaporated and concentrated.

The specific ingredient-dissolved liquid is obtained as follows. That is, a specific ingredient such as lithium or uranium in sea water is adsorbed onto an adsorbent, and the adsorbed specific ingredient is desorbed from the adsorbent with a specific desorbing liquid. The thus desorbed liquid containing the specific ingredient is collected as the specific ingredient-dissolved liquid).

On the other hand, when it is rainy, the specific ingredient-dissolved liquid will be diluted with rain, since the treating tank section is open as an open pool. Therefore, the specific ingredient-dissolved liquid is led downwardly into the corresponding tank section through the openings l*a* by opening the valves 1*b*, and is stored therein. At that time, the treating tank section 15, 16 are communicated with the fresh water tank section 17, so that rain collected in the treating tank section can be transferred to the fresh water tank section 17. The rain water stored in the fresh water tank section is effectively utilized as fresh water for the production of the specific ingredient-dissolved liquid.

If raining stops, rain water in the treating tank section in the upper tank is completely transferred to the fresh water tank section, while any excess rain water is removed. Thereby, the treating tank section is made empty. Then, the valves at the bottom of the treating tank section are closed. Thereafter, the specific ingredient-dissolved liquid stored in the lower corresponding tank section is raised, via the pipe openings 4 communicating with the interior of the lower tank section, through the circulating pipes 6, and the liquid is sprayed above the treating tank section in the upper tank 1 through the spray nozzles at the upper end portions of the circulating pipes 6. Since the valves at the bottom of the treating tank section are closed, the specific ingredient-dissolved liquid sprayed is stored in the treating tank section. While or after the specific ingredient-dissolved liquid is sprayed from the lower tank section, the liquid in the treating tank section in the upper tank is sucked via the pipe openings 3 and also sprayed through the spray nozzles. If the electromagnetic valves are used as the valves 1*b*, the above operations may be more accurately controlled. The spray nozzles and the liquid-falling openings may be provided in a lattice fashion as shown in FIG. 2(*a*), but their arrangement, shapes, etc. are not particularly limited.

After the specific ingredient-dissolved liquid is evaporated to the concentration of 40 to 50% through circulation in the treating tank section, the liquid can be further concentrated through evaporation under heating. The evaporation under heating is effected by using the condensed specific ingredient-dissolved liquid-storing tank section 14. The specific ingredient-dissolved liquid concentrated in the treating tank section 15, 16 in the upper tank 1 is transferred to the storing tank section 14, and the liquid is further transferred to the boiler 10 by the pump 12 through a transfer line. The specific ingredient-dissolved liquid is heated in the boiler 10 where about 85% of the original specific ingredient-dissolved liquid can be evaporated off.

Post-concentrating treatment is effected by a conventional method according to the kind of the specific ingredient. The post-concentrating treatment is not particularly limited to any conventional one.

For example, when the specific ingredient is lithium, the condensed specific ingredient-dissolved liquid is treated as follows. When hydrochloric acid or sulfuric acid was used as a desorbing liquid, lithium is moved into the solution of hydrochloric acid or sulfuric. In the specific ingredient-dissolved liquid, magnesium, calcium, manganese, sodium and potassium are mixed as impurities besides lithium. Therefore, it is necessary to remove such impurities.

The condensed specific ingredient-dissolved solution is transferred to an alkaline treatment tank (not shown) which may be provided either in or outside the concentrating. In the alkaline treatment apparatus, an aqueous solution of sodium hydroxide is poured into the specific ingredient-dissolved liquid, thereby precipitating magnesium hydroxide, manganese hydroxide, etc. Impurities such as the precipitated magnesium hydroxide, manganese hydroxide, etc. are removed by filtering the specific ingredient-dissolved solution.

The filtrate of the specific ingredient-dissolved liquid having undergone the alkaline treatment is transferred to another tank (not shown) where lithium carbonate is precipitated and collected by the addition of sodium carbonate to the liquid.

When the specific ingredient is uranium, the specific ingredient-dissolved solution is treated as follows. Uranium dissolved in sea water can be adsorbed onto amidoximes resin, and adsorbed uranium can be desorbed with use of a mineral acid such as an aqueous solution of hydrochloric acid. However, the concentration of uranium in the desorbed solution is as far low as about 20 to 100 ppm. Therefore, uranium cannot be solidified and used as a yellow cake, unless it is condensed. Further, in the specific ingredient-dissolved liquid, impurities such as magnesium and calcium are contained besides uranium. In order to dispose of such impurities, after the specific ingredient-dissolved liquid is subjected to adsorption with a resin, for example, a chelate resin or an ion exchange resin, as adsorbent, uranium can be dissolved out with an alkaline solution. As the chelate resin, a chelate resin having glycine-N, N-bis(methylene phosphonic acid) as a ligand may be used, for example. The adsorbed amount of uranium on the chelate resin varies depending upon the concentration of the acid used for desorbing uranium from the amidexmes resin. If the concentration of the acid is low, uranium can be effectively desorbed. For example, if hydrochloric acid is used as the acid, the concentration of hydrochloric acid is preferably 0.1 to 0.9 N. By the above treatment, uranium is condensed to a concentration of around 1000 ppm.

Uranium adsorbed on the chelate resin may be dissolved out with an aqueous solution of $NaHCO_3$. The uranium adsorbed on the ion exchange resin may be dissolved out with use of NaCl solution, for example.

Although either the chelate resin or ion exchange resin is used alone, it may be that uranium is condensed with use of the chelate resin, and then uranium is further condensed with the ion exchange resin. In this case, uranium can be condensed to a concentration of around 2000 ppm.

Ammonia water and hydrochloric acid are added into the desorbed liquid, thereby precipitate and isolate ammonium uranate (yellow cake). This treatment can be effected in the treating tank section (not shown). The desorbed liquid from which the specific ingredient is recovered can be repeatedly used as a desorbing liquid to desorb uranium from the adsorbent as it is. On the other hand, the sodium hydrogen-carbonate aqueous used to take out uranium in the chelate resin is used again as a dissolving liquid to dissolve out uranium from the chelate resin. Since hydrochloric acid and ammonium ions are poured in recovering the yellow cake as a solid, the 1N sodium chloride aqueous solution cannot be used again. Therefore, a tank for the sodium chloride aqueous solution is provided as a treating tank for the treatment of the condensed specific ingredient-dissolved tank.

As shown in FIG. 1(*a*), the condensing apparatus is provided with a motor 11 to be used in the entire system, the transfer pump 12, and fuel tank 13 which is for transferring sodium carbonate with the crane 18 running on the deck. The buoyancy frame 19 is moored with mooring units 19.

Since the apparatus for condensing the specific ingredient-dissolved liquid according to the present invention may be fixed not on land, but in ocean, the installation can be easily effected, while the operation area can be easily changed. This enables evacuation of the condensing apparatus from bad weather in the ocean.

The apparatus for condensing the specific ingredient-dissolved liquid according to the present invention further has the advantage that since the specific ingredient-dissolved liquid (desorded liquid) can be evaporated to some extent in the exposed pool, the energy required for the evaporation under heating can be reduced.

What is claimed is:

1. A specific ingredient-dissolved liquid condensing apparatus for concentrating a specific ingredient which is dissolved in the liquid, comprising an upper tank, a lower tank provided under the upper tank, the upper tank being provided with a liquid-falling opening and a valve for falling a specific ingredient-dissolved liquid in the upper tank to the lower tank, a circulator for circulating the specific ingredient-dissolved liquid in the upper tank, and a transfer means for transferring the specific ingredient-dissolved liquid in the lower tank into the upper tank wherein the upper tank is open to the atmosphere so that the specific ingredient-dissolved liquid in the upper tank is subjected to evaporation by the sun.

2. The specific ingredient-dissolved liquid condensing apparatus set forth in claim 1, which further comprises a controller for controlling the valve and circulator such that when the weather is not rainy, the valve is closed and the circulator circulate the specific ingredient-dissolved liquid in the upper tank, whereas when it is rainy or rains, the circulation of the specific ingredient-dissolved liquid is stopped, the valve is opened to fall the specific ingredient-dissolved liquid in the upper tank into the lower tank through the liquid-falling opening, and then the valve is closed.

3. The specific ingredient-dissolved liquid condensing apparatus set forth in claim 1, wherein the circulator comprises a fountain for ejecting the specific ingredient-dissolved liquid above the liquid in the upper tank.

4. The specific ingredient-dissolved liquid condensing apparatus set forth in claim 1, wherein the transfer means comprises a fountain for ejecting the specific ingredient-dissolved liquid above the liquid in the upper tank.

5. The specific ingredient-dissolved liquid condensing apparatus set forth in claim 1, which further comprises a fresh water tank for storing rain water collected in the upper tank.

6. The specific ingredient-dissolved liquid condensing apparatus set forth in claim 1, which further comprises a condensing tank for storing the specific ingredient-dissolved liquid condensed in the upper tank.

7. The specific ingredient-dissolved liquid condensing apparatus set forth in claim 1, which further comprises a boiler for further condensing the condensed specific ingredient-dissolved liquid.

8. The specific ingredient-dissolved liquid condensing apparatus set forth in claim 1, which further comprises a treating tank for treating the concentrated specific ingredient-dissolved liquid.

9. The specific ingredient-dissolved liquid condensing apparatus set forth in claim 1, which comprises a buoyancy frame for floating the apparatus in water and a mooring unit for fixing the apparatus at a given location of said water.

10. The specific ingredient-dissolved liquid condensing apparatus set forth in claim 1, which further comprises a crane movably arranged above the upper tank.

* * * * *